(12) United States Patent
Fontijn

(10) Patent No.: US 6,643,757 B2
(45) Date of Patent: Nov. 4, 2003

(54) LOGICAL STORAGE OF UDF DESCRIPTORS BY MAPPING A PLURALITY OF DESCRIPTORS INTO A PHYSICAL LAYER

(75) Inventor: Wilhelmus Franciscus Johannes Fontijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 205 days.

(21) Appl. No.: 09/835,630

(22) Filed: Apr. 16, 2001

(65) Prior Publication Data

US 2002/0046333 A1 Apr. 18, 2002

(30) Foreign Application Priority Data

Apr. 17, 2000 (EP) .............................................. 00201370

(51) Int. Cl.[7] .............................................. G06F 12/00
(52) U.S. Cl. ..................................................... 711/202
(58) Field of Search ........................... 711/4, 202, 203, 711/205, 207, 208, 209; 369/53.19

(56) References Cited

U.S. PATENT DOCUMENTS 6,243,340 B1 * 6/2001 Ito et al. ................... 369/53.19
2002/0013889 A1 * 1/2002 Schuster ...................... 711/203

OTHER PUBLICATIONS

Universal Disk Format Specification, OSTA Optical Storage Technology Association.

* cited by examiner

Primary Examiner—Kimberly N. McLean-Mayo
(74) Attorney, Agent, or Firm—Laurie E. Gathman

(57) ABSTRACT

Descriptored information is stored in a file system according to a Uniform Disk Format Specification UDF. It accommodates storage of both data and descriptor items, through separating a descriptor item from the data through storing the former in a dedicated logical sector. In particular, the descriptor items are assigned to a dedicated and immediately accessible directory space. Within the directory space, successive logical sectors are mapped at mutual stepping distances that are a factor less than a physical sector size that is uniform among data and descriptor items.

6 Claims, 2 Drawing Sheets

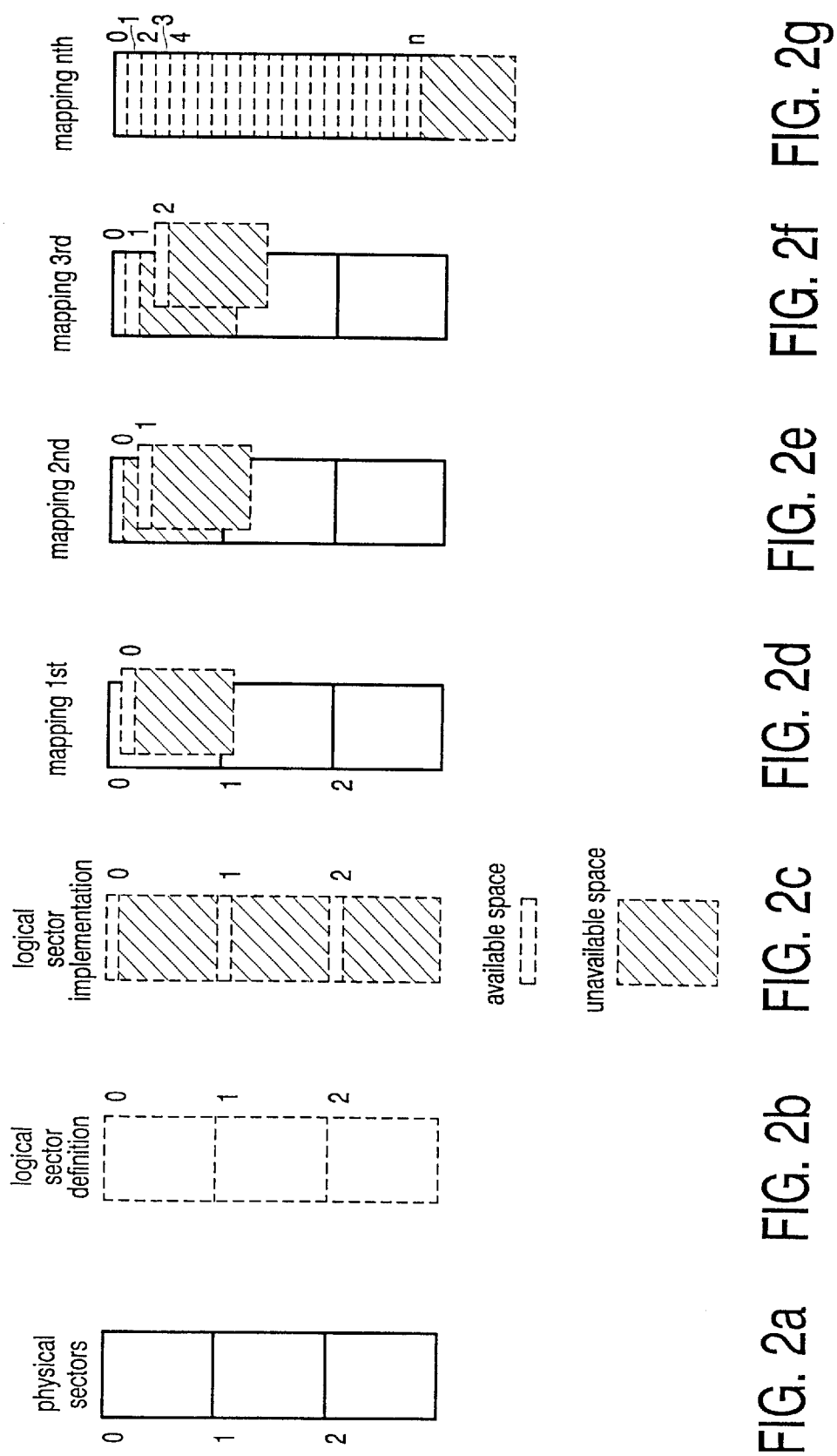

LOGICAL STORAGE OF UDF DESCRIPTORS BY MAPPING A PLURALITY OF DESCRIPTORS INTO A PHYSICAL LAYER

BACKGROUND OF THE INVENTION

A well-known storage format meeting this definition has been standardized under the name of Universal Disk Format UDF and published in OSTA Universal Disk Format Specification, by Optical Storage Technology Association, 311 East Carrillo Street, Santa Barbara, Calif. 93101, USA, Copyrighted 1994–1997. UDF is platform-independent and has an advantageous degree of flexibility. As requested by the UDF, each descriptor will be stored in a separate logical sector. Various instances discussing the descriptor format and usage have been given on pages 7, 8, 17, 19, 20–25, 34–38, 44–49, 50, 57, of the above document. Now in particular, according to the standard, the size of the logical sector is uniform for storing data blocks as well as for storing descriptors. The environment of the present invention is directed to physically exchangeable storage items.

Now, for so-called streaming storage devices, and also for devices-with a large storage capacity such as surpassing 10 Gigabytes and used for digital tape drives and other, it is necessary to employ large physical sectors that may have a capacity such as 32 kBytes, and represent the smallest separately addressable storage items. However, most descriptors have a size only in the range between 0.25 and 1 kBytes. Evidently, this would result in throwing away a large part of the available storage space, with each descriptor requiring its own physical sector. Moreover, the reading of directory information would require an exceptionally long time, especially in the case of streaming devices, in particular, because the reading of a 1 kB descriptor would take the same time as reading a 32 kB physical sector. The problem is aggravated where drive apparatuses for newer, high capacity, storage media will take relatively much time for operations such as in particular tape winding, rewinding, and head positioning. In this context, an additional trend is directed towards using larger physical sectors, which aggravates the problem.

SUMMARY TO THE INVENTION

In consequence, amongst other things, it is an object of the present invention to formulate a storage procedure that would allow the use of larger physical sectors whilst keeping directory access time at a low value, and also to maintain storage efficiency through allowing the filling of directory sectors and certain other sectors, such as those used for storing metadata.

Now therefore, according to one of its aspects the invention is characterized by assigning descriptor items to a dedicated and immediately accessible directory space, and within the directory space, mapping successive logical sectors at mutual stepping distances that are a factor less than a physical sector size which size is uniform among data and descriptor items. The descriptors may contain volume and directory information, and file attributes, also known as metadata.

The invention also relates to a large-capacity and/or streaming storage device for implementing the invention and a storage medium driver arranged for accessing such medium. Further advantageous aspects of the invention are recited in dependent Claims.

BRIEF DESCRIPTION OF THE DRAWING

These and further aspects and advantages of the invention will be discussed more in detail hereinafter with reference to the disclosure of preferred embodiments, and in particular with reference to the appended Figures that show:

FIGS. 2a–2g, various mapping configurations inside the storage medium;

DETAILED DESCRIPTION OF PREFERRED EMBODIMENTS

Figure 1:
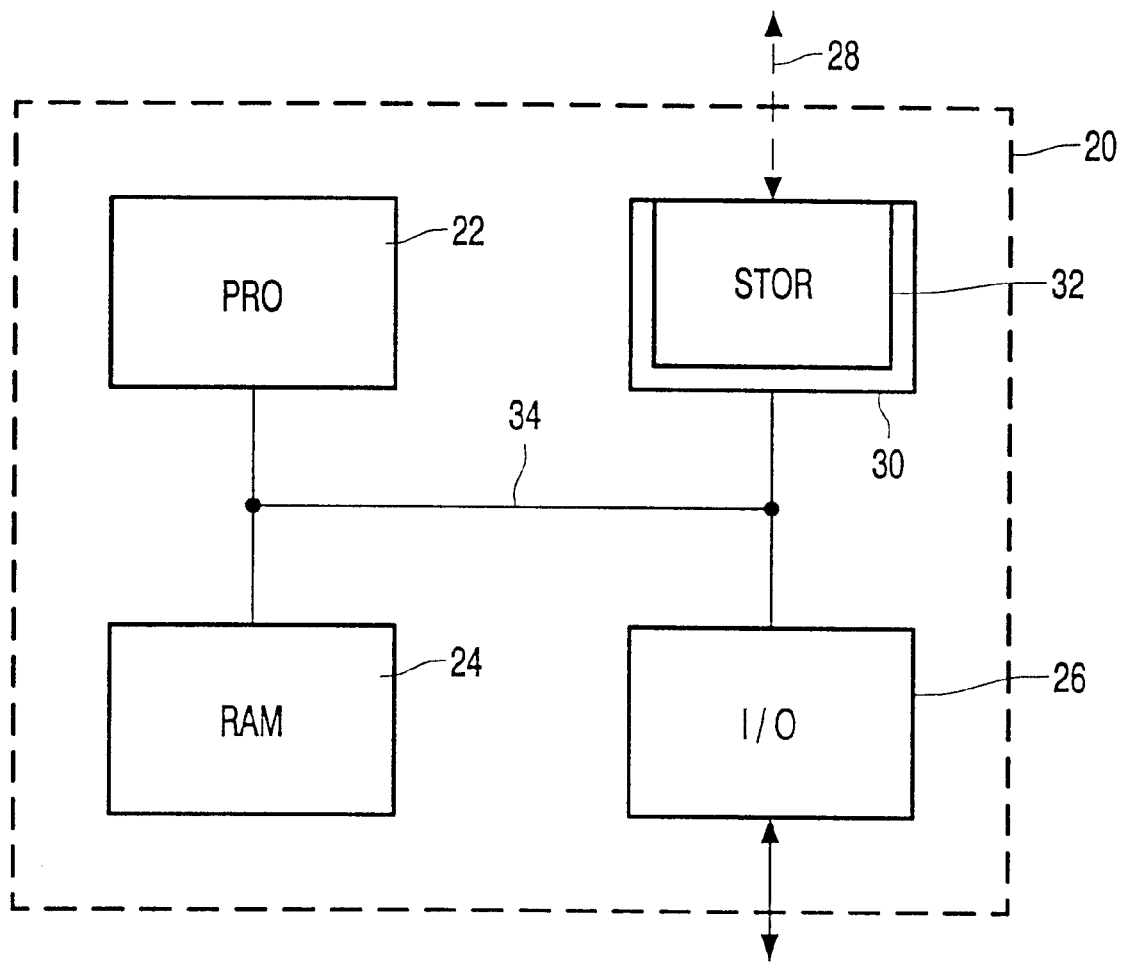
FIG. 1, a driver-device-and-medium storage system.

The present invention proposes a format that remains compatible with the UDF format definitions by providing uniform-sized logical sectors for both data and descriptors, but to internally map a plurality of descriptors onto a single physical sector. The sector size could for example be 32 kBytes, whereas limiting the descriptor size to 1 kByte would allow to map 32 descriptors onto a single sector. Preferably but not restrictively, descriptors and data are stored in separate partitions or another category of various physically separate locations. This feature allows the medium driver to determine whether it should perform the mapping and subaddressing, or rather should access and present the full sector.

FIG. 1 illustrates a driver-device-and-medium storage system. The overall system 20 contains a data facility processing 22, RAM memory facility 24, I/O facility 26 interfacing to an outside world not specified for reasons of brevity, and a storage facility 30, the latter in particular in accordance with the present invention. All of these facilities are interconnected by communication facility 34 that can be bus-based. The overall functionality of the system can be as broad as a general purpose or special purpose computer, or a dedicated medium driver apparatus whose principal usage is to interface storage facility 30 to the outside world, or a specifically configured system that can have other subsystems not shown for brevity next to those shown to fulfill appropriate functions in a digital data processing context. Storage facility 30 as shown contains a storage device or medium 32 that is physically exchangeable and/or replaceable along arrow 28. As regarding the storage organization, the exchangeability and/or replaceability are not mandatory per se, but have been indicated on a conceptual level. By itself, the storage medium proper can have widely varying characteristics; magnetic tape and hard computer disc are viable alternatives.

FIGS. 2a–2g illustrate various mapping configurations inside the storage medium. These are based on proposing the following for UDF implementations that need a logical sector size that is larger than a UDF-size (>2 K); such format has been found by the present assignee to represent a very useful combination with UDF:

(a) For the entire volume the 'formal' UDF logical sector size is set equal to the physical sector size, as is required by the UDF standard. If litteral compliance to the UDF standard is not required, the logical sector size is made equal to the size of any convenient aggregation of physical sectors.

(b) A separate directory space is defined, for therein concentrating all data that are not file data, i.e. metadata. No actual file data is allowed in this space.

(c) Within the directory space the physical starting addresses of consecutive logical sectors are mapped much closer together (e.g. 1 K apart) than the logical sector length implies. In the file space, the mapping of logical onto physical sectors, or onto convenient aggregates thereof, will be one on one.

The proposed logical sector implementation is given schematically in FIG. 2. FIG. 2a depicts a set of three physical sectors. Physical sectors are the smallest unit of data addressable by the hardware. FIG. 2b depicts a set of three logical sectors. Logical sectors are the smallest unit of data addressable by the software. In UDF, the logical sector size is equal to the physical sector size. Note that the physical sector size as seen by the system need not be equal to the real physical size of the medium. In particular, the sector size considered by UDF is the one which the drive itself will signal The FIG. 2c indicates that the space of a logical sector actually made available is only a small and fixed part of the logical sector. UDF implementations are, in principle, allowed to write only in this available space. The remainder of the logical sector would then be unavailable and should be ignored completely by the system.

The proposed logical sector mapping is presented schematically in FIGS. 2d–2g. Each subsequent logical sector is mapped as from the beginning of the space that is unavailable to the previous logical sector. This necessitates preventing that the UDF implementation attempts to write file data in the same sector where its descriptor is located as this space is occupied by the following sectors. In fact, various options are still open to solve this point. A first solution is to force 1 K descriptors by implying a maximum value in the standard. Another solution would be separate bookkeeping outside the UDF context, of which sectors were available. A third approach is to specifically manage the free-space bitmap of UDF, e.g. by letting any remap only apply to the separate region for storing the file entries Now, the UDF implementation must recognize the fact that structures larger than the available sector space would extend into one or more subsequent sectors, which thus become unavailable. In FIG. 2d, a first logical sector is mapped; in FIG. 2e, a second logical sector is mapped; in FIG. 2f, a third logical sector is mapped. In FIG. 2g, twenty-two logical sectors have been mapped, filling the three pysical sectors of FIG. 2a almost completely: the shaded region needs no dedicated space.

The proposed logical sector mapping blocks all data from the directory space and greatly reduces the amount of empty room in that space. As a result, a partition or another type of physically separate location solely for directory information is defined which can be read and written to fast and efficiently. All the while the File System FS remains fully UDF-compliant and therefore accessible to present and future UDF read implementations. Write implementations of UDF must recognize the concentrated metadata in the directory space and the limits of writing to logical sectors in this space.

What is claimed is:

1. A method for storing information with descriptors in a file system according to a Universal DISK Format Specification UDF, and accommodating in said method the storage of both data and descriptor items, whilst separating a descriptor item from the associated data through storage of the descriptor in a dedicated logical sector, said method being characterized by assigning said descriptor items to a dedicated and immediately accessible directory space, and within said directory space, mapping successive logical sectors at mutual stepping distances that are a factor less than a physical sector size which size is uniform among data and descriptor items.

2. A method as claimed in claim 1, wherein said factor is an integer, and in particular, a power of 2.

3. A method as claimed in claim 1, wherein descriptors and data are stored in mutually separate partitions or another type of physically separate locations.

4. A streaming storage device being arranged for implementing a method for storing information with descriptors in a file system according to a Universal Disk Format Specification UDF, and accommodating in said method the storage of both data and descriptor items, whilst separating a descriptor item from the associated data through storage of the descriptor in a dedicated logical sector, said method being characterized by assigning said descriptor items to a dedicated and immediately accessible directory space, and within said directory space, mapping successive logical sectors at mutual stepping distances that are a factor less than a physical sector size which size is uniform among data and descriptor items.

5. A large-capacity storage device being arranged for implementing a method for storing information with descriptors in a file system according to a Universal Disk Format Specification UDF, and accommodating in said method the storage of both data and descriptor items, whilst separating a descriptor item from the associated data through storage of the descriptor in a dedicated logical sector, said method being characterized by assigning said descriptor items to a dedicated and immediately accessible directory space, and within said directory space, mapping successive logical sectors at mutual stepping distances that are a factor less than a physical sector size which size is uniform among data and descriptor items.

6. A storage medium driver being arranged for accessing a medium with information stored according to a method for storing information with descriptors in a file system according to a Universal Disk Format Specification UDF, and accommodating in said method the storage of both data and descriptor items, whilst separating a descriptor item from the associated data through storage of the descriptor in a dedicated logical sector, said method being characterized by assigning said descriptor items to a dedicated and immediately accessible directory space, and within said directory space, mapping successive logical sectors at mutual stepping distances that are a factor less than a physical sector size which size is uniform among data and descriptor items.

* * * * *